(12) United States Patent
Sluz et al.

(10) Patent No.: US 8,667,343 B2
(45) Date of Patent: Mar. 4, 2014

(54) HIGH SPEED ERROR DETECTOR FOR FADING PROPAGATION CHANNELS

(75) Inventors: Joseph E. Sluz, Ellicott City, MD (US); James L. Riggins, II, Halethorpe, MD (US); Juan C. Juarez, Windsor Mill, MD (US); David W. Young, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 545 days.

(21) Appl. No.: 13/045,857

(22) Filed: Mar. 11, 2011

(65) Prior Publication Data

US 2012/0063773 A1    Mar. 15, 2012

Related U.S. Application Data

(60) Provisional application No. 61/312,724, filed on Mar. 11, 2010.

(51) Int. Cl.
*G06F 11/00*      (2006.01)
(52) U.S. Cl.
USPC ........................................................ 714/704
(58) Field of Classification Search
USPC ........................................................ 714/704
See application file for complete search history.

(56) References Cited

U.S. PATENT DOCUMENTS

| | | |
|---|---|---|
| 5,414,711 A | 5/1995 | Okada et al. |
| 5,761,216 A | 6/1998 | Sotome et al. |
| 6,052,423 A | 4/2000 | Blois et al. |
| 6,788,654 B1 * | 9/2004 | Hashimoto et al. ........... 370/321 |
| 7,032,139 B1 | 4/2006 | Iryami et al. |
| 7,085,561 B1 | 8/2006 | Kwolek et al. |
| 7,373,561 B2 | 5/2008 | Baumer et al. |
| 7,421,016 B2 | 9/2008 | Fischel et al. |
| 7,509,568 B2 | 3/2009 | Kapur et al. |
| 7,519,874 B2 * | 4/2009 | Salant et al. ................... 714/704 |
| 2009/0049346 A1 * | 2/2009 | Bay ................................. 714/57 |
| 2009/0177932 A1 | 7/2009 | Abts et al. |

FOREIGN PATENT DOCUMENTS

WO    WO 2004/073244      8/2004

* cited by examiner

*Primary Examiner* — Albert Decady
*Assistant Examiner* — Enam Ahmed
(74) *Attorney, Agent, or Firm* — Noah J. Hayward (57) ABSTRACT

A customized bit error rate tester that characterizes data transmission through a free space optical channel that overcomes the limitations of commercial based bit error rate testers by providing visibility into packet based channel capacity by measuring bit-level statistics not dominated by fades. In this manner, fade characteristics can be measured and a relationship between fade time and data packet lengths can be developed. Further, analog outputs provide visual real-time data link statistics.

22 Claims, 8 Drawing Sheets

HIGH SPEED ERROR DETECTOR FOR FADING PROPAGATION CHANNELS

CROSS REFERENCE TO RELATED APPLICATIONS

This application claims the benefit of prior filed, U.S. provisional applications: Ser. No. 61/312,724, filed on Mar. 11, 2010.

BACKGROUND OF THE INVENTION

1. Field of the Invention

The present invention relates generally to communication systems. The invention solves the problem of developing a network protocol over a propagation channel that is subject to frequent intensity fades due to turbulence effects, e.g., free space optical (FSO) communications channels. The invention addresses the problem of measuring the bit error rate BER through fading channels using standard bit error rate testers BERT's. The invention involves a method of characterizing data transmission through a free-space optical channel. In other aspects the invention concerns a receiver and hardware, firmware and software designed to perform the method.

2. Description of the Related Art

Developing a network protocol over a propagation channel requires a detailed knowledge of the characteristics of the channel. As a function of time, the channel may be impaired by noise if the channel experiences power loss due to fades as a result of a variety of physical effects. The channel may also experience impairments due to time-varying dispersions. While the measurement of a single impairment may be possible, such as recording Signal-to-Noise ratio as a function of time, the combined effects of all impairments on the communication system can really only be measured by recording the Bit Error Ration (BER). As is well known, the BER is the system level characterization that reveals the effectiveness of the channel for communications. This ratio can be measured by sending known information at the transmitter, and comparing the information received after going through the propagation channel to expected information. The data sent over the channel may be packet based or some fixed pseudo-random bit stream. However, a channel that is time varying and experiences deep fades where complete data loss occurs could rapidly have the measurement results dominated by the fades, even if they do no occur frequently. For example, free Space Optical (FSO) communications channels can exhibit high percentage availability, yet are subject to frequent intensity fades due to turbulence effects.

For gigabit class links, tremendous amounts of data can still be transported through a fading channel, but an efficient network protocol is required to overcome the effects of fades. However, developing a network protocol over a propagation channel requires a detailed knowledge of the characteristics of the channel. As a function of time, the channel may be impaired by noise if the channel experiences power loss due to fades that result from a variety of physical effects. The bit error ratio is the system-level characterization that reveals the effectiveness of the channel for communications. However, a problem with available bit error rate testers BERT's is that they are designed for non-faded signals and their results are dominated by fades if the fades occur more rapidly than the instrument can be polled for data. Consequently, the measurement of bit error rate through fading channels using standard bit error rate (BER) detectors/testers is that they fail to successfully characterize the channel for data transmission. Furthermore, standard BER detectors do not need to acquire quickly, with the longer acquisition times guaranteeing pattern lock. This results in large penalties in faded channels. Still further, the timing accuracy of these commercial testing devices regarding their time to synchronize to the data and declare loss of synchronization when the signal is lost is not provided by manufacturers, and in some cases is quite an extensive amount of time. In a link that experiences frequent fades, these unknown parameters can significantly influence the measurement results. With propagation channels such as those provided by Free Space Optical (FSO) Communications, the data rate is many Gigabits per second. Consequently, the fades of the channel become the dominant feature of the link. Conventional BER detectors are designed for fiber systems with nearly constant link characteristics, where error tests are done over many hours to establish a degree of confidence for ultra-low bit error ratio floors of $1 \times 10^{-12}$ and below. Free Space Optical (FSO) channels, however, have frequent fades, typically in the tens to hundreds per second which result in loss of meaningful statistics, as the Bit Error Ratio (BER) summary results are dominated by even a single fade event. Furthermore, polling the instrument is often limited in speed, so that attempting to capture results between fades are not successful.

Another drawback of standard BER detectors is that they fail to provide fade related impact statistics. That is, they fail to reveal channel dynamics. This is disadvantageous in that the understanding of channel dynamics can reveal optimal packet length strategies.

Accordingly, a need exists for a customized bit error rate (BER) tester to reveal the true statistics of a channel for proper network layer design. In particular, it is desirable to have a measurement device that can characterize a propagation channel without adopting a protocol that may be non-optimal for the link.

SUMMARY OF THE INVENTION

Therefore, the present invention has been made in view of the above problems. Accordingly, the disclosed invention is a technology for measuring the bit error rate through a fading channel using a customized bit error rate tester that overcomes the limitations of conventional bit error rate testers by providing bit-level time statistics of a propagating channel, including time statistics of the channel with fades. The bit-level time statistics of the invention provide information including, but not limited to, the statistics of the fades, throughput statistics for varying packet lengths, the frequency of the fades, and the average time between fades.

In one aspect, a customized bit error rate tester for use in a receiver comprises a pattern generator circuit adapted to generate a repetitive sequence of synchronization symbols for rapid pattern synchronization, a high-speed serial transceiver including a linear feedback shift register including taps adapted to match received test sequences received over an optical channel; an error detector coupled to the high-speed serial transceiver and adapted to synchronize the high-speed transceiver, the error detector further comprising: a histogram tracking module adapted to track the error performance of the receiver by collecting bit level statistics including: a first plurality of counters for recording a frequency of fade duration and a second plurality of counters for recording a frequency of contiguous error free bits of a user definable block length of M consecutive bits, a bit error rate tracking module adapted to track the error performance of the receiver by collecting bit level statistics including: a user programmable parameter for defining a bit error rate J, wherein the user defined bit error rate occurs over a second user programmable parameter defining an averaging window of size K bits, wherein said second user programmable parameter triggers a re-synchronization of the receiver, a third plurality of counters for recording a number of times a bit error rate was observed over a user definable block length of K consecutive bits, a raw statistics tracking module adapted to track the error performance of the receiver by collecting bit level statistics including: a first counter for recording the total number of bits transmitted over the optical channel, a second counter for recording the total number of bits dropped due to loss of synchronization, a third counter for recording the total number of bits transmitted while the receiver is in a state of synchronization, a fourth counter for recording the total number of bits in error while the receiver is in said state of synchronization, a fifth counter for recording the total number of times the receiver entered into a state of synchronization.

In one aspect, the invention can be implemented using a common pseudorandom test sequence, such as a PRBS7 sequence as designated by a polynomial $x^7+x^6+1$, however, any conceivable data could be used, even packet-based data. A key criterion, recognized by the inventors, is that the sequence should be small relative to the channel fade durations in order to resolve the nature of the channel.

A receiver can include one or more programmable parameters which directly determine the time for synchronization by identifying the amount of pattern to be matched before synchronization can be declared and further determine the amount of pattern mismatch before loss of synchronization is declared, with the exact synchronization timing loss provided to the bit level.

A receiver can further include an error detection circuit which includes a copy of the pseudorandom sequence generated by the pattern generator as a comparison sequence against incoming data. The error detector circuit declares loss of synchronization, whenever a user selected BER ratio is reached, as measured over a user selectable number of bits.

An embedded controller interface is coupled to the cBERT analyzer to enable a personal computer or other device to poll and collect the counter data from the cBERT. This interface allows the external device to set parameters such as sync-in and sync-out criteria, as well as read the received bit statistics.

A receiver can further include an on-board clock for determining the number of bits dropped during a total loss of the optical channel.

A receiver can further include high speed digital pulse outputs that indicate synchronization and bit error rate status.

In one aspect of the invention, the counter field widths of the counters exceed 64 bits to facilitate testing over long periods before experiencing counter overloads and zero roll overs.

Many aspects of the previously described invention may be constructed as software objects that execute in embedded devices as firmware, software objects that execute as part of a software application on a computer system running an operating system such as Windows, UNIX, LINUX, etc., an Application Specific Integrated Circuit (ASIC) or functionally equivalent discrete hardware components.

In one aspect, the invention comprises a method of characterizing a propagation channel by providing bit-level time statistics of the propagating channel during synchronization and non-synchronization modes, the method comprising, (a) determining while in said non-synchronized state whether the receiver has received at least N bits error free, (b) acquiring certain bit level statistics while in said non-synchronized state; (c) outputting a high speed digital sync pulse indicating sync acquisition upon declaring synchronization by satisfying said determining step, (d) determining while in a synchronized state whether a bit error rate J is observed over a block size of K bits, (e) acquiring certain other bit level statistics while in said synchronized state, and (f) repeating step (a) upon satisfying said determining step (d), otherwise repeating steps (d)-(e).

BRIEF DESCRIPTION OF THE DRAWINGS

These and other objects, features and advantages of the invention will be apparent from a consideration of the following Detailed Description Of The Invention considered in conjunction with the drawing Figures, in which.

DETAILED DESCRIPTION

1. Introduction

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims.

Preferred embodiments of the customized bit error rate tester and method of operation according to the present embodiments are explained below in detail with reference to the drawings attached below.

A customized bit error rate tester, referred to hereafter as cBERT, is provided that overcomes the limitations of conventional bit error rate testers. The cBERT provides bit-level time statistics of a propagating channel, including time statistics of the channel with fades and throughput statistics for varying packet lengths.

Advantages of the custom BER detector of the invention over conventional BER detectors include, but are not limited to, recording error free period lengths by providing a measure of fade characteristics, providing information to design optimal packet size for the channel and bit-level counting in real time. One advantage is user settable synchronization characteristics using custom design to minimize the sync time and using a sync time that is known a-priori. A further advantage is the ability to maintain statistics while in a sync-out condition. A still further advantage is a rapid polling interface to provide near continuous time statistics. Another advantage is providing analog outputs for bit errors as well as loss of sync states. The cBERT has general applicability to free-space communications, such as free space optical (FSO) systems, and is particularly well-suited for links experiencing frequent fades, typically in the tens to hundreds per second.

As will become apparent, the cBERT of the invention provides meaningful error statistics, such that the bit error rate (BER) is not dominated fade events. The error statistics can be provided for any type of free space communication channel that operate at high speeds. In a preferred embodiment, the error statistics include bit level counters, as well as block based counters, which provide insight to the channel for packet base transmission formats.

The custom bit error rate tester 28 can process a digital signal from a channel having frequent fades below system sensitivity levels and can provide data link statistics with bit-level timing accuracy. If the present invention was not employed, a large number of fades will typically dominate the BER measurement using commercial test equipment. To further illustrate this concept, by way of example, assume a single 5 ms fade event occurs during a test period. In a 1 minute test period, with the single 5 ms fade, the channel would pass 60 million 1 us (2500 bit) packets and only lose 5000 packets for an effective throughput of 99.9917%. That is, a total of 12.5 million bits were in error during the fade. In accordance with the present example, a conventional bit error rate tester would produce aggregate error rate statistics:

a BER of $5.0 \times 10^{-3}$ over 1 second,
a BER of $8.3 \times 10^{-5}$ over 1 minute, and
a BER of $1.4 \times 10^{-6}$ over 1 hour.

In the described embodiments, the custom bit error rate tester 28 performs processing functions and is considered a "processor" which includes the processing elements that are adapted to perform the recited operations, regardless of the number of physical elements. Thus, the custom bit error rate tester 28 can comprise all or part of one or more discrete components, integrated circuits, firmware code, and/or software code that receive external electrical signals and cause appropriate electrical signals to be output from said processing device.

Conventional bit error rate testers are only capable of producing aggregate statistics (see above) which have no visibility into packet based channel capacity. However, if each bit error was distributed across each 1 us packet, only 79% of the packets would have been received.

Figure 1:
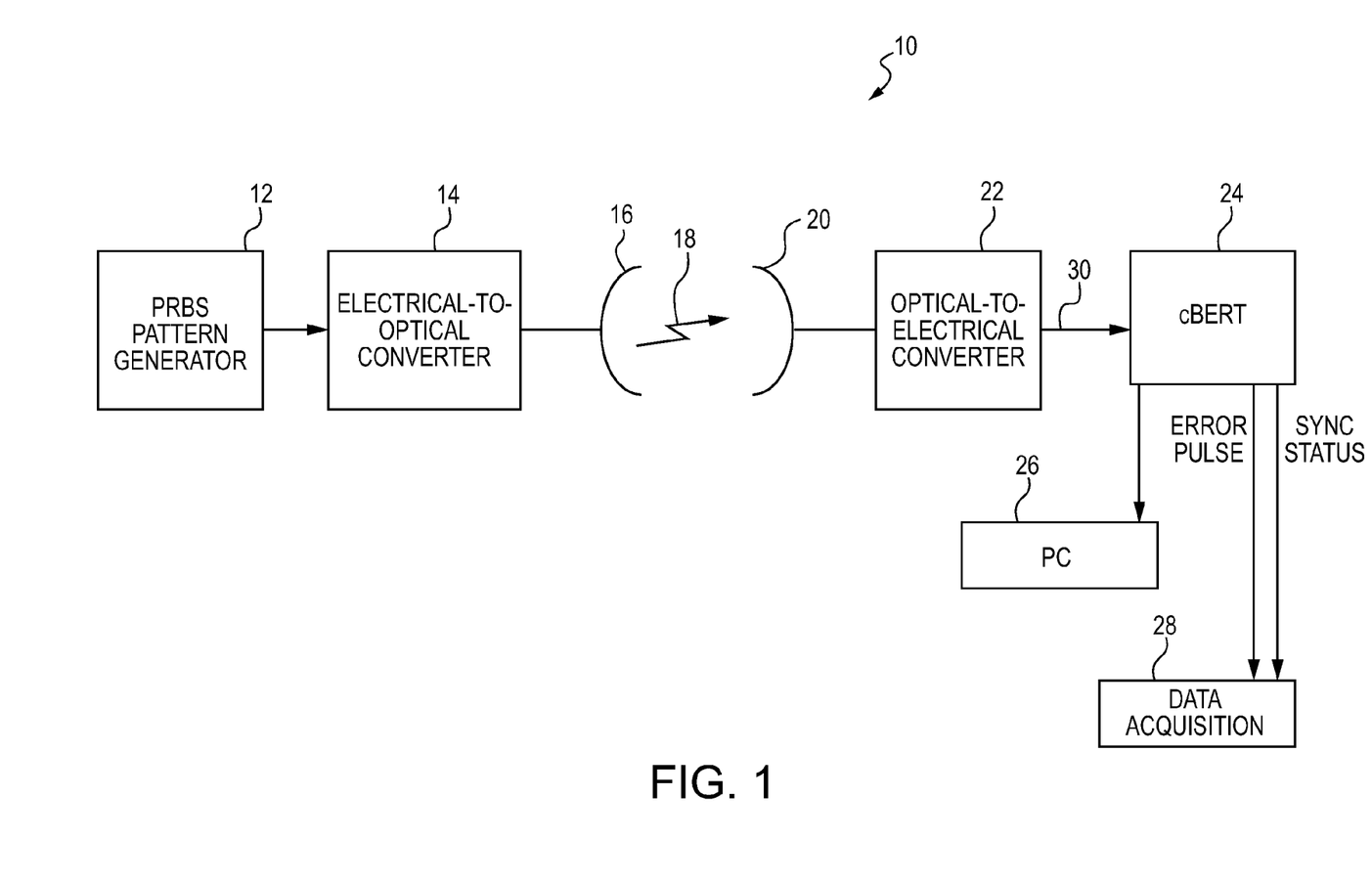
FIG. 1 is a drawing illustrating an example of a communication channel employing the customized bit error rate tester (cBERT), according to one embodiment.

FIG. 1 illustrates an exemplary free space optical (FSO) communications channel 100 including the novel customized bit error rate tester (cBERT) 24. As shown in FIG. 1, the FSO communications channel 100 generally includes, on the transmitter side, a pattern generator 12 for generating a repetitive pattern that is known α-priori to the cBERT 24 to facilitate synchronization on the receiver side. An output of the pattern generator 12 is upconverted to an optical signal by electrical-to-optical converter 16 by modulating the electrical signal onto an optical carrier using devices such as Mach Zehnder modulators. A free space optical signal 18 output from the electrical-to-optical converter 16 is transmitted into free space.

On the receive side of the link, an optical terminal 20 collects the free space optical signal 18 and converts the signal into the electrical domain by optical-to-electrical converter 22. In one embodiment, optical-to-electrical converter 22 may be implemented as a photo-receiver. A resultant electrical data signal 30 is analyzed using the customized bit error rate tester (cBERT) 24 of the invention, described in greater detail below. Personal computer 26 configures the cBERT 24 and periodically collects data from the cBERT 24. Real time signals, indicating error and sync status are also output from the cBERT 24 and are collected and stored in the data acquisition module 28 which digitizes the voltage levels versus time.

Figure 2:
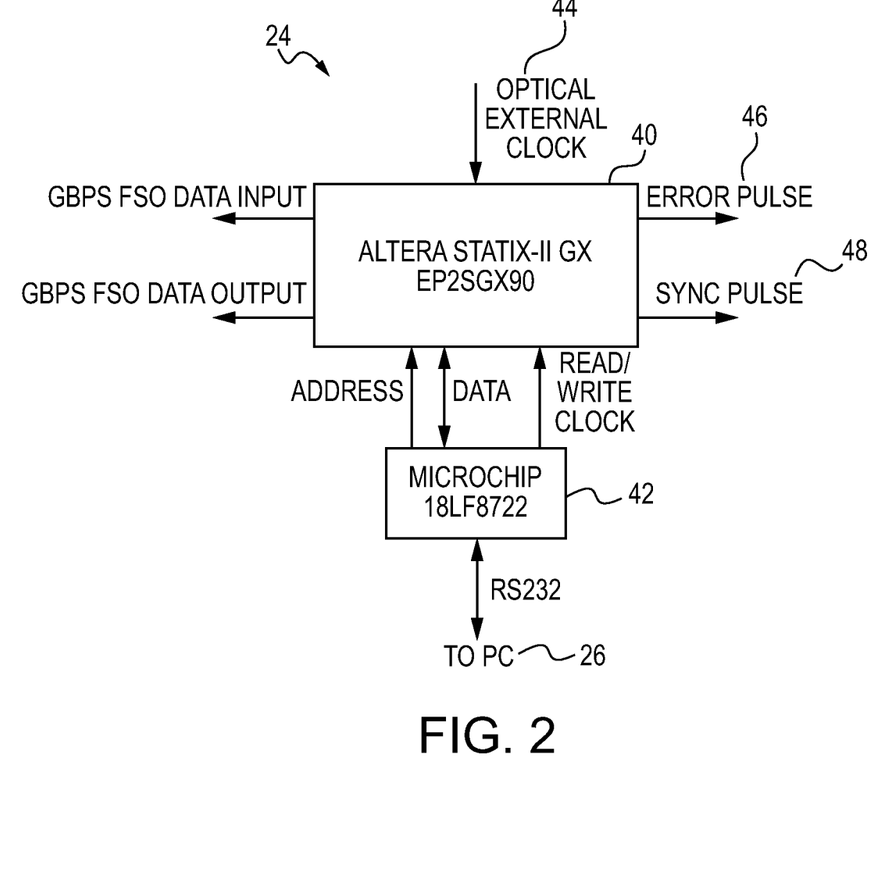
FIG. 2 is a drawing illustrating a hardware embodiment of the cBERT of FIG. 1 in more detail.

FIG. 2 shows an embodiment of the cBERT 24 in more detail. As shown in the example of FIG. 2, the cBERT 24 is implemented in hardware as an Altera-Stratix-II GX EP2SGX90 FPGA, labeled 40. Alternatively, the FPGA could be implemented, for example, using an Altera Stratix V GT supporting up to 28 Gbps or an Achronix offering up to 10.3 Gbps or future envisioned implementations. The exemplary implementation shown in FIG. 2 allows high speed serial data generation and processing where data analysis can be performed real time by a user within the FPGA code. High speed counters (not shown) are accessible via a parallel bus which is interfaced with a Microchip 18LF8722 embedded controller, labeled 42. The embedded controller 42 strobes the FPGA 40 for data and sends the retrieved data counter values out the RS232 serial port 50 in binary mode when the appropriate serial command is received. In other embodiments, a soft processor can be created internal to the FPGA 40, thereby eliminating the need for a separate processor.

An on-board clock (not shown) allows for the generation of an assortment of typical communication rates, while an optional external clock input 44 provides for setting any particular data rate within the 0.6-6.375 Gbps range. The on-board clock is required to clock the transmitter portion of the design, and also required to provide a seed for the receiver when the high speed block has not ascertained clock lock to the external data. The on-board clock further determines the total number of bits lost during a total loss of the channel. Unlike commercial error detectors which must rely on an incoming clock and data to determine the total number of bits lost during a total loss of the channel. The local on-board clock operates at a sub-rate of the serial data, and typical stability would be 10-50 parts per million.

Two electrical output signals 46, 48 are shown based on the internal FPGA 40 for real time data to provide stretched pulse outputs whenever a bit error occurred as well as the sync state. These signals can be used as a real time visual aid when coupled with other data like signal power over time.

Figure 3:
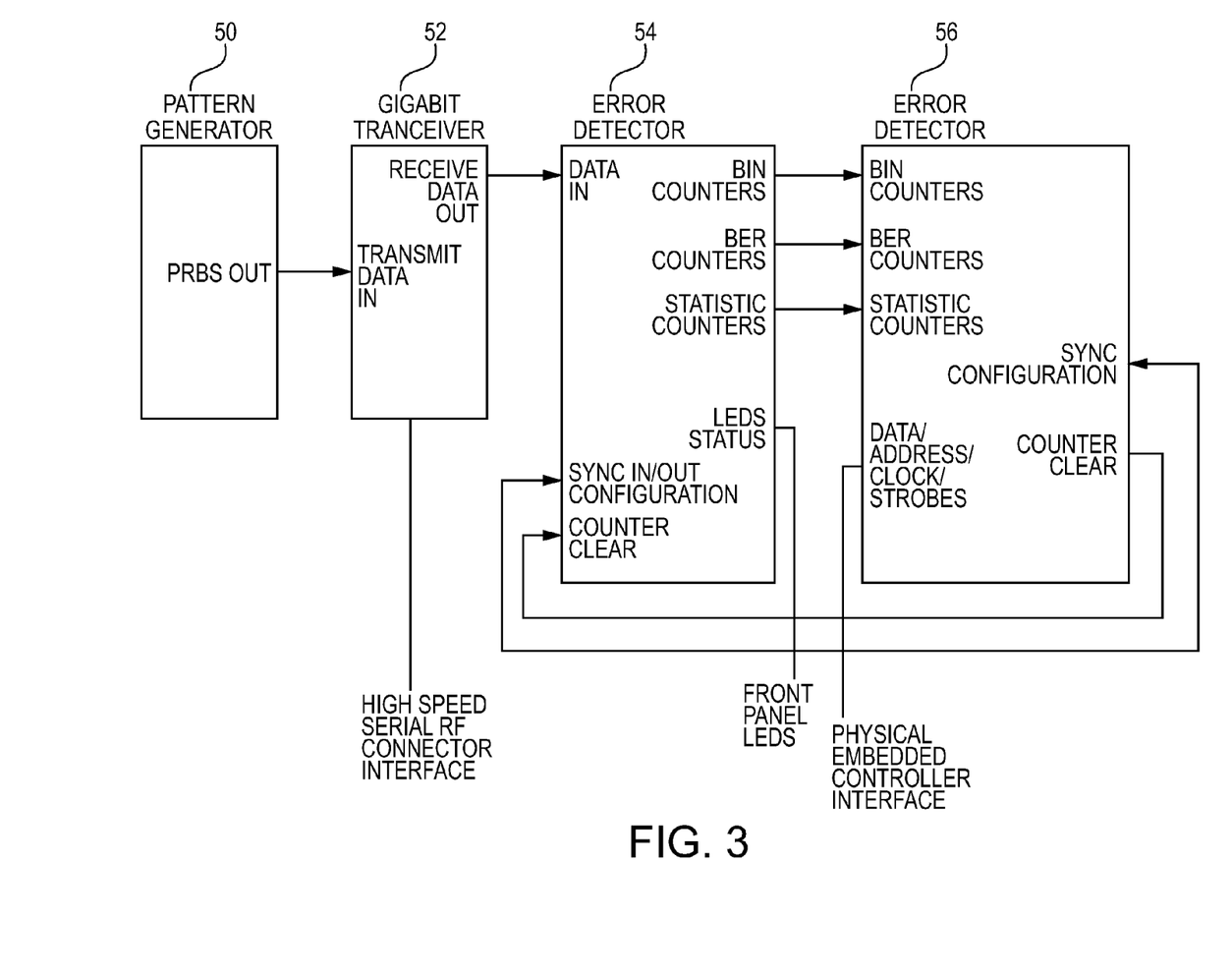
FIG. 3 is a drawing illustrating a firmware implementation of the cBERT of FIG. 1 in more detail.

FIG. 3 is a drawing illustrating the firmware implementation of FIG. 2 in more detail. As shown in the example of FIG. 3, the firmware implementation includes a pattern generator 50, a high speed (e.g., gigabit) serial transceiver 52, an error detector 54, and an embedded controller interface 56.

Pattern Generator 50

The pattern generator 50 is adapted to generate a repetitive sequence of synchronization symbols for rapid pattern synchronization. The pattern generator 50 includes a linear feedback shift register with taps fixed to match PRBS7 test sequences, using the polynomial x7+x6+1, which are used extensively in conventional bit error rate testers. In the embodiment shown, the pattern generator 60 was parallelized to be 40-bits wide to match the Altera FPGA high speed transceiver's 40-bit wide bus (double width mode).

High-Speed Serial Transceiver 52

The high-speed serial transceiver 52 includes a linear feedback shift register further including taps adapted to match received test sequences received over an optical channel.

Error Detector 54

The error detector 54 contains an internal copy of the same PRBS7 sequence used in the pattern generator 50. The internal copy of the PRBS7 sequence is used as a comparison sequence against incoming data. Before error detection can occur, the pattern must be located within the incoming data stream, a process referred to as synchronization, discussed in detail further below with respect to FIGS. 4 and 6.

Embedded Controller Interface 56

The embedded controller interface 56 is coupled to the cBERT analyzer 24 to enable a personal computer or other device to poll and collect the counter data from the cBERT. This interface allows the external device to set parameters such as sync-in and sync-out criteria, as well as read the received bit statistics.

Figure 4:
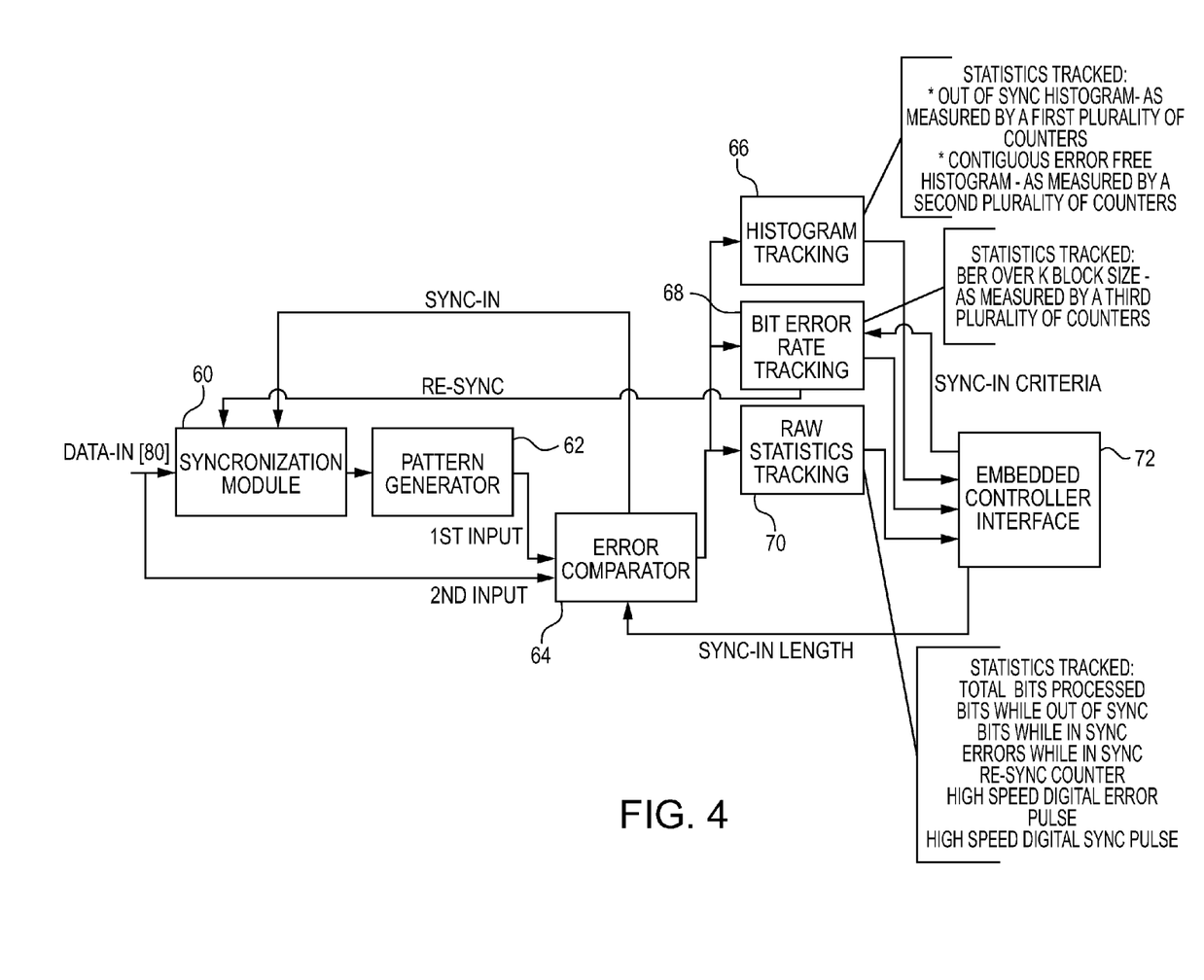
FIG. 4 is a drawing illustrating the error detector of FIG. 3 in more detail.

FIG. 4 is a drawing illustrating the error detector 54 of FIG. 3 in more detail. As shown in the example of FIG. 4, received data 80 is fed into the synchronization module 60, upon reset or re-synchronization the received input data 80 is used to drive a linear feedback shift register (LFSR) contained within the pattern generator 62, the LFSR having feedback taps set to be the same as the incoming data stream. By using the incoming data instead of the feedback path to drive the LFSR the output of the LFSR becomes aligned to the pattern location of the incoming data.

The error comparator 64 compares the incoming data stream with the locally generated pattern output from the synchronization module and outputs an error signal upon mismatch. During synchronization once N bits (user definable) have been observed, error free synchronization is declared and the input data stream 80 is decoupled from the second input of the error comparator 64 to prevent duplication.

Raw Statistics Tracking Module

The raw statistics tracking module 70 tracks traditional BERT statistics including: the total number of bits processed, the number of bits processed while in sync, the number of bits processed while out of sync, the number of errors detected while in sync, and the number of re-synchronizations that have occurred, a high speed digital error pulse and sync pulse is also output from this module.

Bit Error Rate Module

The Bit Error Rate module 68 tracks a plurality of BER counters which tracks the number of times the error rate has reached one of several standard bit error rates over a user-defined block length of K bits. The plurality of BER counters record a running BER count of how often a bit error rate is exceeded over a user programmable count of bins. A user can select any of the BER counters as the gating mechanism for declaring loss of sync (pattern slip), at which point the process of synchronizing the pattern begins again.

Histogram Tracking Module

The Histogram tracking module 66 includes two sets of histogram counters. A first set of histogram counters comprising a plurality of counters for measuring the number of times a contiguous error free block of length $M_n$ (user defined) occurs, where M is the number of error free bits to be observed and n is the number of counters in the histogram set. In an alternate embodiment, the first set of histogram counters can measure a length of time over which contiguous error free bits are received, assuming a fixed data rate. The second set of histogram counters for measuring the number of times, while out of sync, a contiguous segment of data of block of length $P_n$ occurs, where P is user defined and represents the number of contiguous bits while out of sync to be observed and n is the number of counters in the histogram. Each of the first and second set of histogram counters are described as follows.

The first set of histogram counters keep track of how many bits were received in a good synchronization state (error free), and how many bits were coming in while the cBERT failed to locate pattern synchronization within the programmable criteria (sync-out phase). In one embodiment, a bank of counters consists of a programmable set of bins, where each bin is a given number, a cumulative method of implementing the counters for recording a number of bits received error free is now described.

According to the method, each bin can be viewed as block of data that has a given length in bits. Each bin is incremented as the number of error free bits received equals the block size for the particular bin. For example, assuming two bins designated respectively as "'1000 bits" and "2000 bits". If 1000 bits are received error free, then the "1000 bits" counter is incremented. If the error free run of received bits continues to 2000, the "1000 bits" bin is incremented again, and the "2000 bits" bin is incremented as well. If the run has 3000 bits received error free, the "1000 bits" bin would be incremented for a third time, and the "2000 bits" bin would be incremented once.

The bin designators are configurable. The smallest number of bits received error free is set by the channel dynamics. Aside from errors due to additive white Gaussian noise, typical channel propagation characteristics for free space communications will occur at rates below 100 KHz, which is a substantially larger period relative to the bit rate.

In an alternative embodiment, the counters are constructed as a histogram of the number of bits received in a row without errors. In such an embodiment, if bins are designated, for example, as "1000 error free bits", "2000 error free bits" and "5000 error free bits", and assuming 5000 bits were received error free, only the "5000 error free bits" bin would be incremented. This embodiment requires a larger number of bins, otherwise the resolution of the measurement becomes less than the cumulative realization.

The second set of histogram counters measure the number of times, while out of sync, a contiguous segment of data of block of length $P_n$ occurs, where P is user defined and represents the number of contiguous bits while out of sync to be observed and n is the number of counters in the histogram. In an alternate embodiment, this counter can measure the number of times, while out of sync, a length of time over which a contiguous segment of data of block of length $M_n$ (user defined) occurs, assuming a fixed data rate. This set of counters characterizes the distribution of periods in which the receiver is out of sync and can be used to characterize fade duration.

Figure 5:
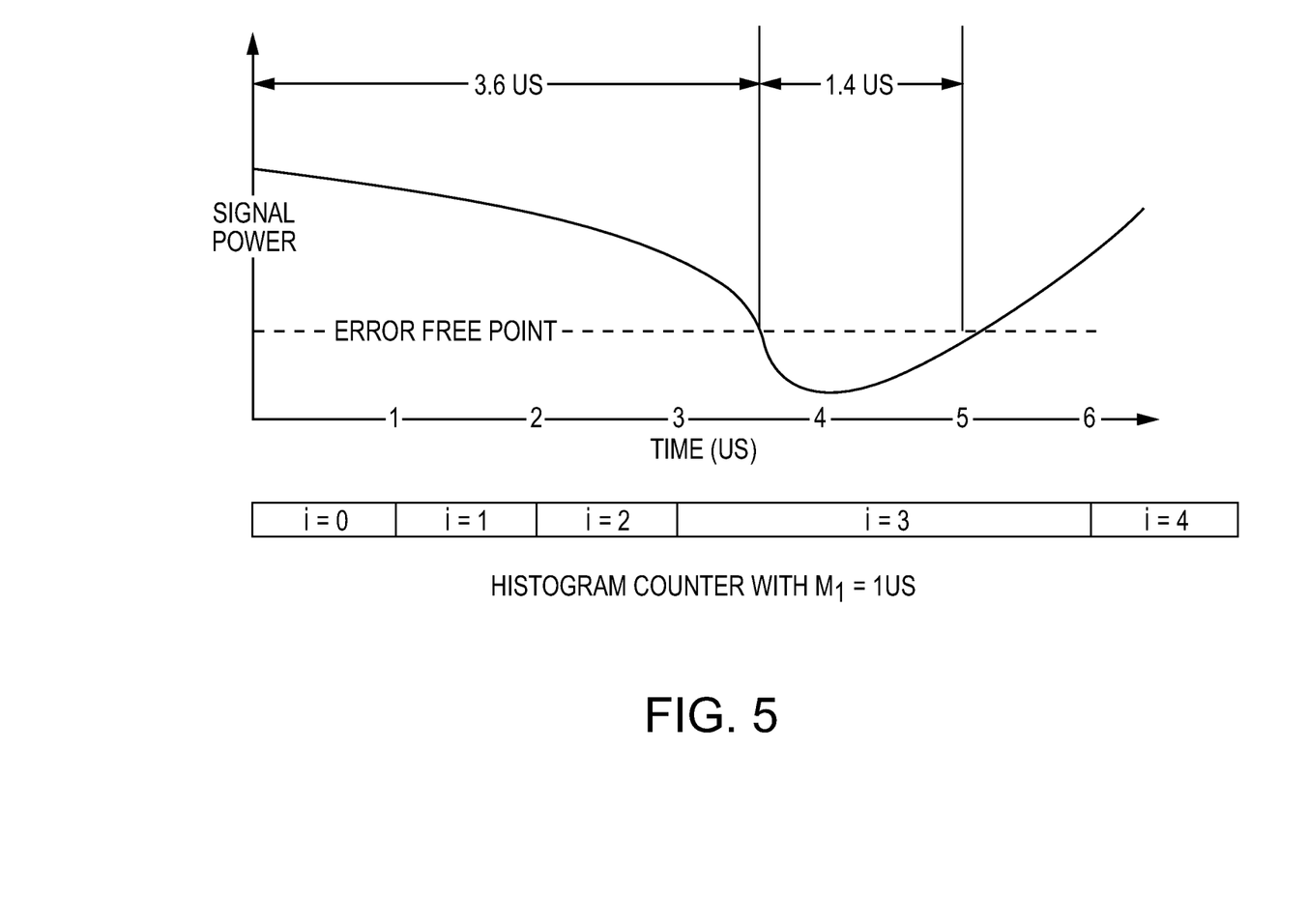
FIG. 5 is a drawing illustrating how one of the error free histogram bin counters of FIG. 3 increments in a faded environment.

FIG. 5 illustrates, by way of example, how the Contiguous Error Free Histogram is incremented. In particular, FIG. 5 describes how one of the counters is incremented. The plot illustrated in FIG. 5 shows an example of the signal power of a received bit stream, the dotted line represents the error free threshold, above which no errors occur in the received bit stream due to sufficient received signal power. However, as the received power falls below the line at approximately the 3.6 us point, errors are incurred. Thereafter, as the received signal power steadily increases, the threshold value is crossed once more at the 5 us point in time at which the errors cease. An example histogram counter, i.e., counter #1 of n counters, from among the contiguous error free histogram counters is illustrated below the plot of FIG. 4. In this case the error free length $M_1$ is a user defined parameter in units of time. In the present illustrative example, the parameter $M_1$ is defined as 1 us. The $M_1$ counter increments when 1 us of contiguous error free data is observed. In the present example, error free data has been observed for more than 3 us causing the $M_1$ counter to attain a value of 3. However, during the time period between 3 us and 5 us, a number of errors were observed. During this time period the $M_1$ counter does not increment due to the presence of errors. The $M_1$ counter does not increment again until another 1 us of error free data is observed. This is shown to occur between 5 us and 6 us, causing the $M_1$ counter to increment by +1 to a value of 4.

Figure 6:
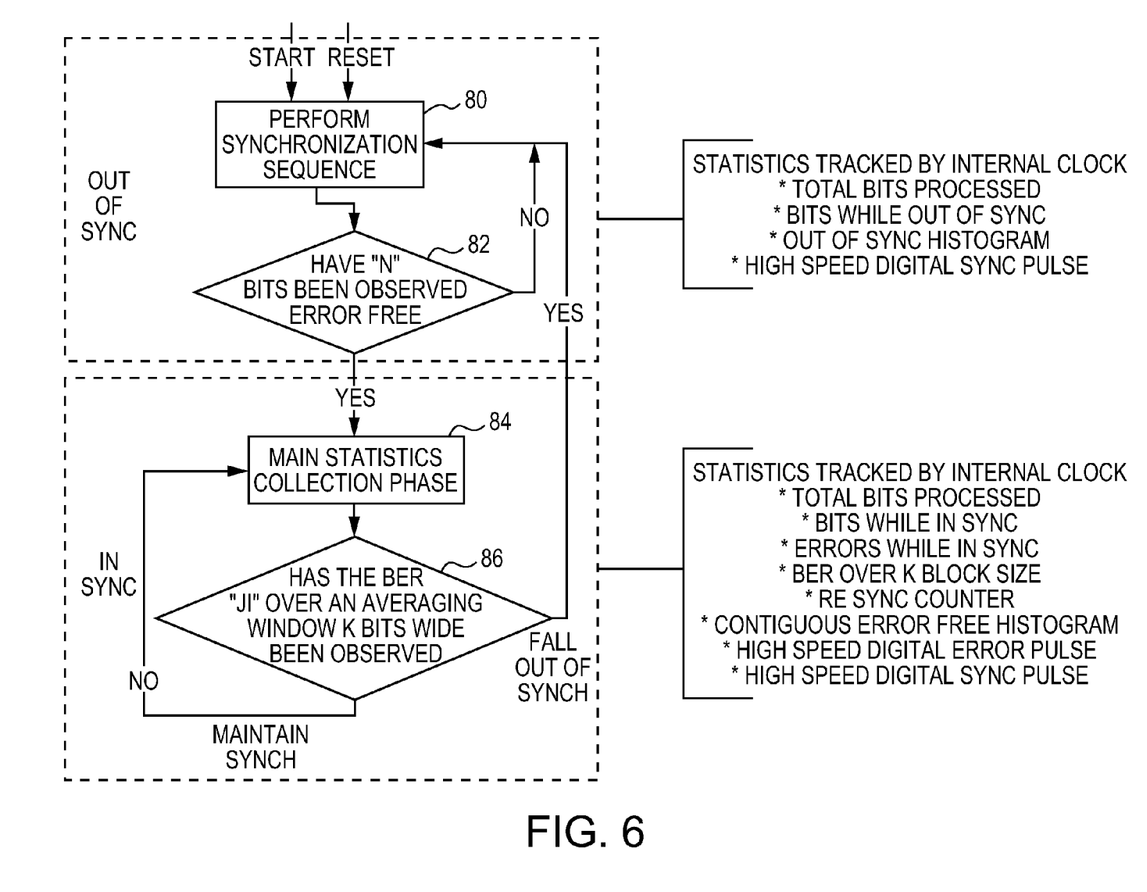
FIG. 6 is a drawing illustrating a high level flow chart illustrating a process flow for synchronizing and re-synchronizing an incoming pattern in a receiver.

FIG. 6 depicts a high level flow chart that illustrates a process flow for synchronizing and re-synchronizing an incoming pattern in a receiver. The process is generally divided into two portions, a first portion labeled "out-of-sync" describing a sub-process for attaining synchronization and for regaining a lost synchronization. While in the "out-of-sync" state, certain statistics are collected by the cBERT analyzer 24. As shown, those statistics include, Total bits processed, Bits while out of sync and the Out of Sync Histogram counters. While in the "out-of-sync" state, the cBERT analyzer 24 also outputs a High speed digital sync pulse. The second portion of the process flow is labeled "in-sync" in FIG. 6 which describes the sub-process for maintaining a state of synchronization. While in the "in-sync" state, certain other statistics are collected by the cBERT analyzer 24. As shown, those statistics include, Total bits processed, Bits while in sync, Errors while in sync, BER over K block size counters, Re-sync counter and the Contiguous Error Free Histogram counters. While in the "in-sync" state, the cBERT analyzer 24 also outputs a High speed digital sync and error pulse.

As shown in FIG. 6, in one exemplary embodiment of the invention, the process starts at block 80, labeled "Synchronization Sequence", which occurs while the system is in the so-called "out-of-synch" state. A synchronization sequence 80 may be initiated in one of two ways. For example, after a reset or whenever the system falls out of a state of synchronization. The system may fall out of synchronization for any number of reasons, including, for example, loss of incoming clock or data recovery causing pattern slip. To attain synchronization at block 80, a synchronization sequence stored in the error comparator 64 of the receiver shown in FIG. 5 is compared with an incoming sequence pattern output from the pattern generator 62 of the receiver of FIG. 5 to determine if there is a match. In one embodiment, a chain is initialized to ones, and then clocking generates a repetitive 127 bit PRBS sequence, which has the characteristic of a maximum of 7 one's and 6 zero's in a row. The particular sequence was selected to allow for rapid pattern synchronization, as well as being a common sequence that can be generated with all commercial bit error rate testers. In other embodiments, simple code changes allow for other common PRBS test sequences or custom patterns. One advantage of using common test PRBS sequences is it allows the transmitter side to use commercial pattern generators if custom hardware is not available. One requirement for synchronization is for error free PRBS frames to be detected. More particularly, it is required to have a programmable number of frames to be present error free, consecutively. In some embodiments, it is envisioned to use a son autocorrelation, which would then allow some bit errors to be present, typically providing shorter error free reception than the more stringent requirement of a programmable number of frames to be present error free. However, the more stringent requirement avoids any false pattern locks which may lead to error duplication. While this approach may produce a slightly longer average sync-in process, a much higher probability of true pattern match is attainable.

At step 82, a determination is made as to whether a user-definable number of bits (N) have been detected error free. If not, the process returns to block 80 to continue to attain synchronization. Otherwise, if it is determined that N bits have been detected error free, then the process passes to block 84 and the system is considered "in-synch". Once sync is declared the main statistics collection phase begins at block 84 during which certain statistics are tracked including, in one embodiment, the total number of bits processed, the number of bits processed while in sync, the number of errors detected while in sync, a set of counters which tracks the number of times the error rate has reached the bit error rate $J_i$ over a user defined block length K, the number of times re-synchronization has occurred, and a set of histogram counters is initiated which measure the number of times a contiguous error free block of length $M_n$ (user defined) occur where M is the number of error free bits to be observed (alternately can be length of time if the data rate is fixed) and n is the number of counters in the histogram set. A high speed digital error pulse and sync pulse is also output at this time. 4 illustrates how a need for re-synchronization is determined, if the BER over an averaging window K (user defined) meets or exceeds the BER $J_i$ (user defined) then the system is declared out of sync and re-synchronization commences. A high speed digital error pulse and sync pulse is also output at this time.

At block 86, the error detector 64 will declare loss of sync whenever a user selected BER ratio is reached measured over a user selectable number of bits, i.e., the BER block size. The BER block size is user configurable, and can be set based on statistics which requires a minimum number of bits for a given confidence level for a given BER. Table 1 illustrates the number of bits required for different percent confidence levels in the measurement for some common BER points. For example, for a confidence level of 95% for a BER of 1.00E-02, a minimum of 230 bits is required before a loss of sync can be declared.

TABLE 1

| | # Bits Required for Percent Confidence Level, 2.5 Gbps | | | |
|---|---|---|---|---|
| BER | 90.000% | 95.000% | 99.000% | 99.990% |
| 1.00E−02 | 230 | 300 | 461 | 921 |
| 1.00E−03 | 2303 | 2996 | 4605 | 9210 |
| 1.00E−04 | 23026 | 29957 | 46051 | 92103 |

Exemplary Application

An exemplary application of the invention includes a Maritime field trial conducted in Jul. of 2009 of the mid-Atlantic coast near Wallops Island, Va. A ship-to-shore link was set up between a former Coast Guard lookout tower located on Cedar Island, Va. And the John Hopkins University/APL research vessel Chessie over a range of 2 to 22 km, optical horizon. The optical link used AOptix LCT-5 Adaptive Optics (AO)-compensated FSO terminals with 2.5 or 10 cm apertures on each end. The LCT-5 terminals use proprietary deformable mirrors and a wavefront sensing approach for high bandwidth (>1 kHz), closed-loop correction of approximately 30 Zernike aberrations, including tip-tilt and focus. The system was configured to correct for link aberrations as well as increase the coupling efficiency into its single-mode fiber output by using tip-tilt and higher order corrections. The AO system also handled fine pointing and tracking of the beam to within −1 deg of its filed of view as measured in the laboratory. For coarse pointing, the FSO terminal was mounted on an azimuth/elevation optical tracking mount operated in gyro-stablilized mode to remove pitch and yaw motion on the vessel Chessie as it transited northbound away from the island-based tower position during test runs. Tracking mount performance was adequate even during 6 to 8 foot seas on the vessel for maintaining coarse optical alignment to <1 deg. On the tower side, course pointing adjustments were manually controlled via a fine adjustment Quickset tripod with aid of an external visible camera and the internal FSO terminal camera.

Figure 7:
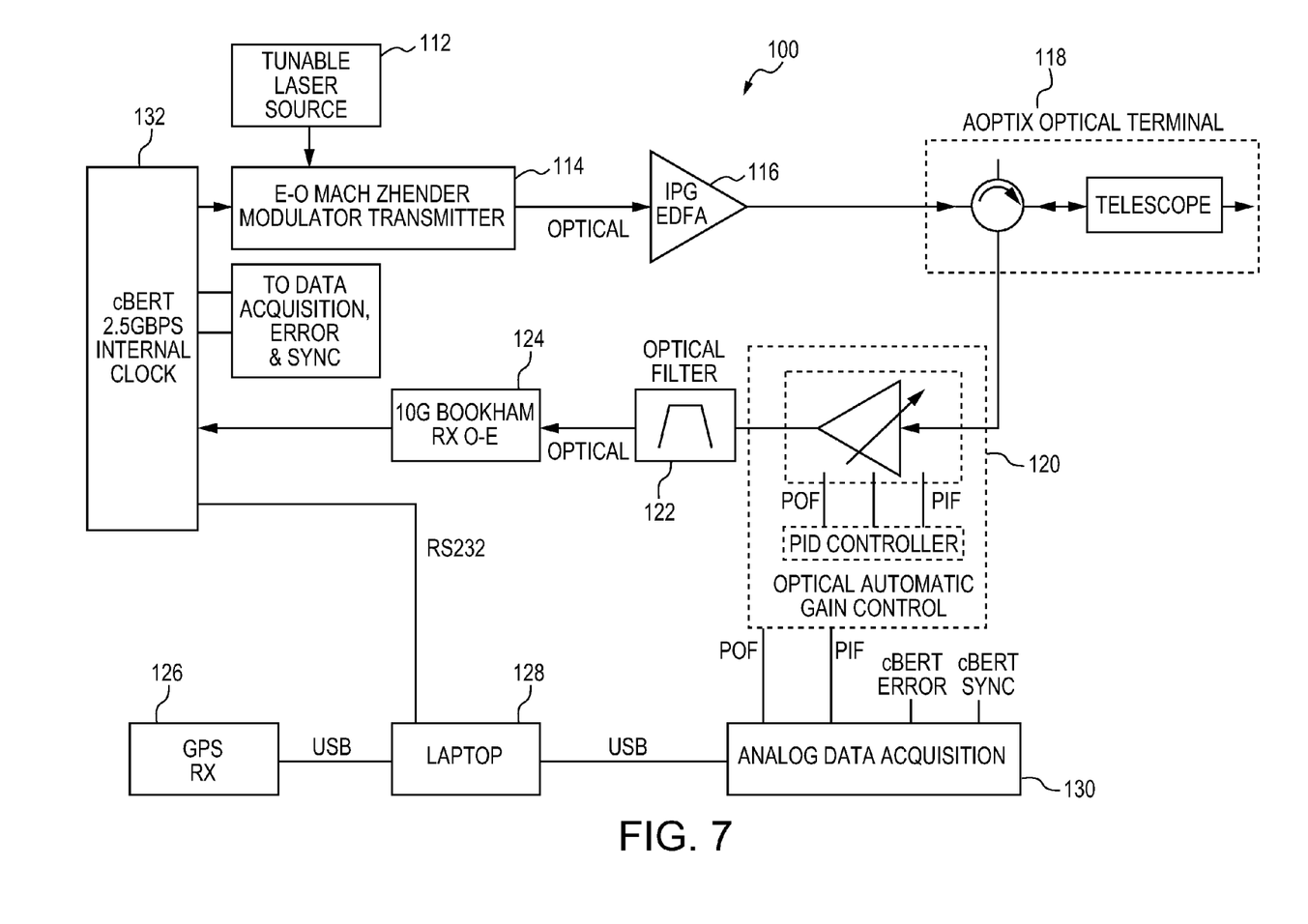
FIG. 7 is a drawing illustrating a functional diagram of an FSO communication system.

A functional diagram of the FSO communication system 100 comprising a customized bit error rate tester (cBERT) 136 constructed in accordance with the present invention is shown in FIG. 7 which illustrates a ground based terminal of the communication link. A duplicate terminal (not shown) was located on the vessel Chessie. A transmitter at each end of the link consists of a tunable laser source 120 operating nominally at 1550 nm feeding an external intensity modulator 14 driven at 2.5 Gb/s. The modulated optical signal is then amplified by an IPG Photonics optical amplifier 116 up to an optical power level of +28 dBm prior to connecting to the AOptix FSO terminal 118. The AOptix FSO terminal 118 then launches the optical signal into free space.

On the receive end of each link, the FSO signal is coupled back into single-mode fiber by the AOptix FSO terminal 118 and filtered with a commercial 100-GHz filter to remove back reflections from the transmit side. The optical signal from the AOptix FSO terminal 118 is then amplified and stabilized by an all optical automatic gain control (OAGC) sub-system 120. The OAGC sub-system 120 stabilizes the optical power and sets the receive system noise floor. The OAGC sub-system 20 has a noise figure of approximately 4 dB with all isolators, filters, taps and connections taken into account and provides more than 40 dB of adjustable optical gain.

For system monitoring, optical taps in the system are detected using photodiodes and high dynamic range log amplifiers (−72 to +10 dBm range) to provide an electrical analog signal proportional to the optical power on a decibel (dB) scale. In addition to the BER and block-based bit counters, the cBERT 136 also provides two stretched error pulse signals that are simultaneously digitized along with the system optical powers. These analog signals were monitored and logged to disk at a 10 k Samples/sec rate.

The stabilized optical signal is detected using a Bookham 10 Gbps PIN photoreceiver 124. In addition to the transimpedance amplifier built into the photoreceiver, an external limiter amplifier provides signal leveling so the electrical pulses can now be interfaced directly to the high speed receiver of the FPGA using the cBERT 132.

The receiver had a $1 \times 10^{-9}$ BER when the input to the optical AGC was approximately −36 dBm. While better sensitivities can be achieved with more exotic modulation formats (e.g., RZ-OOK, RZ-DPSK) and optimal sampling after the PIN receiver as opposed to the limiter based approach in this experiment, for the purposes of this experiment, the approach was sufficient.

Field Trial Results

In the exemplary application, the cBERT 136 was configured with the following parameters
Bit Rate: 2.5 Gbps
Pattern: PRBS7
Sync-In N value: 31, resulting in 40*31=1240 bits required to declare synchronization, 0.496 us.
Block value: 2520 bit long block to calculate BER, about a 1 us long block.

Figure 8:
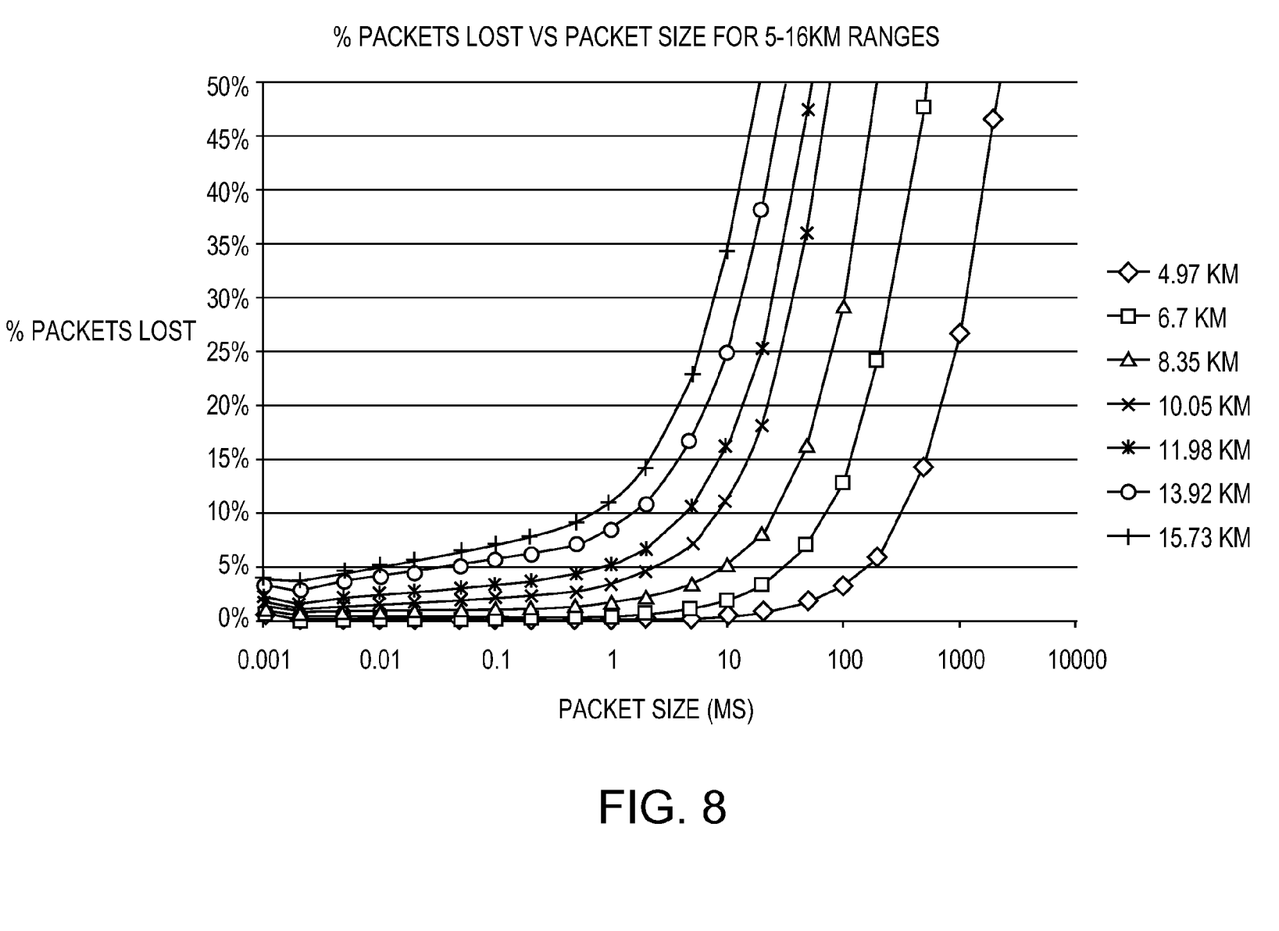
FIG. 8 is a drawing illustrating the typical results obtained from the cBERT from a Ship-Shore free space optical link

Performance data is shown in FIG. 8 for a throughput of packets of various lengths versus range. As shown, the cBERT data for 1 minute was examined for every 15 minutes of boat run. The figure illustrates the number of packets that are lost versus the packet lengths for various boat-to-tower ranges. For short range packets of lengths from 1 us to 1 msec, the throughput is shown to be acceptable with only a small amount of packets being lost at extended ranges to 15 km. Packet lengths above 1 ms, however, rapidly suffer large percentage thru-put losses, especially as range increases. In fact, at ranges of about 15 kilometers, about half of all 10 millisecond length packets will be lost due to fade events.

CONCLUSION

It has therefore been shown that a customized bit error rate tester (cBERT) overcomes the limitations of commercial based testers by providing visibility into packet based channel capacity by measuring bit-level statistics not dominated by fades. In this manner, fade characteristics can be measured and a relationship between fade time and data packet lengths can be developed. Further, analog outputs provide visual real-time data link statistics.

In some embodiments, the functionality of the systems and methods described above may be implemented in part or in whole as software on a general purpose computer. In such an embodiment, the program may be written in any one of a number of high-level languages, such as FORTRAN, PASCAL, C, C++, LISP, JAVA, or BASIC. Further, the program may be written in a script, macro, or functionality embedded in commercially available software, such as EXCEL or VISUAL BASIC. Additionally, the software could be implemented in an assembly language directed to a microprocessor resident on a computer. For example, the software could be implemented in Intel 80×86 assembly language if it were configured to run on an IBM PC or PC clone. The software may be embedded on an article of manufacture including, but not limited to, a "computer-readable medium" such as a floppy disk, a hard disk, an optical disk, a magnetic tape, a PROM, an EPROM, or CD-ROM.

While the invention has been described with reference to an example embodiment, it will be understood by those skilled in the art that a variety of modifications, additions and deletions are within the scope of the invention, as defined by the following claims.

What is claimed is:

1. A customized bit error rate (BER) tester for use in a receiver, comprising:
    a pattern generator circuit configured to generate a repetitive sequence of synchronization symbols for rapid pattern synchronization;
    a high-speed serial transceiver including a linear feedback shift register including taps configured to match received test sequences received over an optical channel; and
    an error detector coupled to the high-speed serial transceiver and configured to synchronize the high-speed transceiver, the error detector comprising:
        a histogram tracking module configured to track the error performance of the receiver by collecting bit level statistics including a first plurality of counters for recording a frequency and distribution of fade duration of a user definable block length of $P_n$ and a second plurality of counters for recording a frequency of contiguous error free bits of a user definable block length of $M_n$ consecutive bits;

a bit error rate tracking configured to track the error performance of the receiver by collecting bit level statistics including: a user programmable parameter for defining a bit error rate J, wherein the user defined bit error rate occurs over a second user programmable parameter defining an averaging window of size K bits, wherein said second user programmable parameter triggers a re-synchronization of the receiver; and a third plurality of counters for recording a number of times a bit error rate $J_i$ was observed over a user definable block length of K consecutive bits; and a raw statistics tracking module configured to track the error performance of the receiver by collecting bit level statistics including: a first counter for recording the total number of bits transmitted over the optical channel; a second counter for recording the total number of bits dropped due to loss of synchronization; a third counter for recording the total number of bits transmitted while the receiver is in a state of synchronization; a fourth counter for recording the total number of bits in error while the receiver is in said state of synchronization; and a fifth counter for recording the total number of times the receiver entered into a state of synchronization.

2. The customized bit error rate tester of claim 1, further comprising an embedded controller interface coupled to the error detector and configured to: retrieve the bit level statistics from the error detector, format the retrieved statistics, and forward the formatted statistics to an external processing device coupled to the embedded controller interface.

3. The customized bit error rate tester of claim 1, wherein the error detector is further configured to track the error performance of the receiver while in a non-synchronized state by collecting bit level statistics including:
a first counter for recording the total number of bits transmitted over the optical channel;
a second counter for recording the total number of bits processed by the receiver in said non-synchronized state; and
a first plurality of counters for recording a frequency of fade duration.

4. The customized bit error rate tester of claim 1, further comprising a first high speed digital error pulse output signal for indicating a state of synchronization.

5. The customized bit error rate tester of claim 4, further comprising a second high speed digital error pulse output signal for indicating a bit error rate status.

6. The customized bit error rate tester of claim 1, further comprising an on board clock for determining the number of bits dropped during a total loss of the optical channel.

7. The customized bit error rate tester of claim 1, wherein the first plurality of counters comprises a programmable set of bins where each bin is assigned a number corresponding to a block size equal to a number of consecutive error free bits received in the receiver while in the synchronized state.

8. The customized bit error rate tester of claim 7, wherein each bin is incremented as the number of error free bits received equals the block size numerical designation for the bin.

9. The customized bit error rate tester of claim 1, wherein the second plurality of counters comprises a programmable set of bins where each bin is assigned a number corresponding to a block size equal to a number of consecutive error free bits received in the receiver while in the non-synchronized state.

10. The customized bit error rate tester of claim 1, wherein the pattern generator circuit includes a linear feedback shift register including a number of taps of the linear feedback shift register that are user defined.

11. The customized bit error rate tester of claim 1, wherein the error detector includes a copy of the pseudorandom sequence generated by the pattern generator as a comparison sequence against incoming data, and wherein the error detector declares loss of synchronization whenever a user selected BER ratio is reached, as measured over a user selectable number of bits.

12. The customized bit error rate tester of claim 1, wherein a counter width of said first, second, third, fourth and fifth counters exceeds 64 bits.

13. The customized bit error rate tester of claim 1, wherein the customized bit error rate tester is realized by a field programmable gate array (FPGA).

14. The customized bit error rate tester of claim 1, wherein certain bit level statistics are acquired while in a state of synchronization including: said first counter for recording the total number of bits transmitted over the optical channel; said third counter for recording the total number of bits processed while the receiver is in a state of synchronization; said fourth counter for recording the total number of bits in error while the receiver is in said state of synchronization; said fifth counter for recording the total number of times the receiver entered into a state of synchronization; said second plurality of counters for recording a frequency of contiguous error free bits of a user definable block length of M consecutive bits; and said third plurality of counters for recording a number of times a bit error rate $J_i$ was observed over a user definable block length of K consecutive bits.

15. The customized bit error rate tester of claim 1, wherein certain bit level statistics are acquired while in a state of non-synchronization including: said first counter for recording the total number of bits transmitted over the optical channel; said second counter for recording the total number of bits dropped due to loss of synchronization; and said first plurality of counters for recording a frequency of fade duration.

16. A method of characterizing a propagation channel by providing bit-level time statistics of the propagating channel during synchronization and non-synchronization modes, the method comprising:
(a) determining while in said non-synchronized state whether the receiver has received at least N bits error free;
(b) acquiring certain bit level statistics while in said non-synchronized state;
(c) outputting a high speed digital sync pulse indicating sync acquisition upon declaring synchronization by satisfying said determining step (a);
(d) determining while in a synchronized state whether a bit error rate J is observed over a block size of K bits;
(e) acquiring certain other bit level statistics while in said synchronized state; and
(f) repeating step (a) upon satisfying said determining step (d), otherwise repeating steps (d)-through (e).

17. The method according to claim 16, wherein N is a user programmable parameter.

18. The customized bit error rate tester according to claim 14, wherein the plurality of bit level statistics acquired while in said synchronized state comprises: a first counter for recording the total number of bits transmitted over the optical channel; a third counter for recording the total number of bits transmitted while the receiver is in a state of synchronization; a fourth counter for recording the total number of bits in error while the receiver is in said state of synchronization; a fifth counter for recording the total number of times the receiver entered into a state of synchronization; a first plurality of counters for recording a frequency of contiguous error free bits of a user definable block length of $M_n$ consecutive bits; and a second plurality of counters for recording a number of times a bit error rate $J_i$ was observed over a user definable block length of K consecutive bits.

19. The customized bit error rate tester according to claim 14, wherein the plurality of bit level statistics acquired while in said non-synchronized state comprises: a first counter for recording the total number of bits transmitted over the optical channel; a second counter for recording the total number of bits processed by the receiver in said non-synchronized state; and a first plurality of counters for recording a frequency and distribution of fade duration of a user definable block length of $P_n$.

20. The method according to claim 16, wherein the block size of K bits is a user configurable parameter.

21. The method according to claim 20, wherein the parameter K is set based on statistics which requires a minimum number of bits for a given confidence level for a given BER.

22. The method of claim 16, wherein the observed BER J is a user configurable parameter.

* * * * *